United States Patent
D'Amico et al.

(10) Patent No.: US 9,884,311 B2
(45) Date of Patent: Feb. 6, 2018

(54) ACTIVATED CARBON AND COAL COMBUSTION RESIDUE TREATMENT SYSTEM AND METHOD

(71) Applicant: MERCUTEK LLC, Newtown, CT (US)

(72) Inventors: Peter D'Amico, Newton, CT (US); Christopher Poling, Bel Air, MD (US); Thomas Lesniak, Clifton Park, NY (US)

(73) Assignee: Mercutek LLC, Newtown, CT (US)

( * ) Notice: Subject to any disclaimer, the term of this patent is extended or adjusted under 35 U.S.C. 154(b) by 0 days.

(21) Appl. No.: 14/385,285

(22) PCT Filed: Mar. 14, 2013

(86) PCT No.: PCT/US2013/031487
§ 371 (c)(1),
(2) Date: Sep. 15, 2014

(87) PCT Pub. No.: WO2013/138620
PCT Pub. Date: Sep. 19, 2013

(65) Prior Publication Data
US 2015/0038321 A1 Feb. 5, 2015

Related U.S. Application Data

(60) Provisional application No. 61/685,240, filed on Mar. 14, 2012.

(51) Int. Cl.
*B01J 20/20* (2006.01)
*B01J 20/34* (2006.01)
*B01D 53/10* (2006.01)

(52) U.S. Cl.
CPC ......... *B01J 20/3416* (2013.01); *B01J 20/20* (2013.01); *B01J 20/3483* (2013.01); *B01D 53/10* (2013.01);
(Continued)

(58) Field of Classification Search
CPC ...... B01D 2258/0291; B01D 2253/102; B01D 2257/60; B01D 2258/0283; B01D 53/10; B01J 20/3416; B01J 20/3483; B01J 20/20
See application file for complete search history.

(56) References Cited

U.S. PATENT DOCUMENTS

| 4,844,815 A | 7/1989 | Ader et al. |
| 5,219,544 A | 6/1993 | Kupper et al. |

(Continued)

FOREIGN PATENT DOCUMENTS

| DE | 3840858 | 9/1989 |
| DE | 19630719 A1 | 2/1998 |

(Continued)

OTHER PUBLICATIONS

Gossman, "Alternatives to ACI," International Cement Revise, May 2011.

(Continued)

*Primary Examiner* — Jennifer A Smith
(74) *Attorney, Agent, or Firm* — Richard P. Gilly; Offit Kurman

(57) ABSTRACT

A method for treating powdered activated carbon (PAC) and/or coal combustion residues (CCRs) by heating at least one of a spent PAC and/or a CCR to separate at least one heavy metal from the at least one of the spent PAC and/or the CCR to create a clean stream and a heavy metal stream, combining the heavy metal stream with a water soluble alkaline-earth metal sulfide to create a combined stream, and removing at least a portion of the at least one heavy metal from the combined stream. The heating may further include heating the at least one of the spent PAC and/or the CCR in an inert atmosphere. Further, the combining may include (Continued)

combining the heavy metal stream with the water soluble alkaline-earth metal sulfide and a catalyst and/or a surfactant or hyperdispersant.

11 Claims, 1 Drawing Sheet

(52) U.S. Cl.
CPC .... *B01D 2253/102* (2013.01); *B01D 2257/60* (2013.01); *B01D 2258/0283* (2013.01); *B01D 2258/0291* (2013.01)

(56) References Cited

U.S. PATENT DOCUMENTS

| | | | |
|---|---|---|---|
| 5,306,475 A * | 4/1994 | Fichtel | B01D 53/34 423/210 |
| 5,405,812 A | 4/1995 | Brüggendick | |
| 5,556,447 A | 9/1996 | Srinivasachar et al. | |
| 6,080,224 A | 6/2000 | Turmel et al. | |
| 6,516,610 B2 | 2/2003 | Hodgson | |
| 6,838,504 B1 | 1/2005 | Webster et al. | |
| 6,942,840 B1 | 9/2005 | Broderick | |
| 7,407,602 B2 | 8/2008 | Hurley | |
| 7,771,683 B2 | 8/2010 | Hurley | |
| 7,776,294 B2 | 8/2010 | Hurley | |
| 8,535,422 B2 | 9/2013 | Via et al. | |
| 2002/0108368 A1 | 8/2002 | Hodgson | |
| 2004/0122277 A1 | 6/2004 | Heller et al. | |
| 2005/0244319 A1 | 11/2005 | Hurley | |
| 2006/0094920 A1 | 5/2006 | Roper | |
| 2007/0092418 A1 | 4/2007 | Mauldin et al. | |
| 2009/0193968 A1 | 8/2009 | Jepsen et al. | |
| 2009/0202407 A1 | 8/2009 | Hurley | |
| 2009/0202424 A1 | 8/2009 | Roper, Jr. | |
| 2009/0283016 A1 | 11/2009 | Mohamed et al. | |
| 2010/0000406 A1 | 1/2010 | Schwab et al. | |
| 2010/0068109 A1 | 3/2010 | Comrie | |
| 2011/0024680 A1 | 2/2011 | Via et al. | |

FOREIGN PATENT DOCUMENTS

| | | |
|---|---|---|
| EP | 1649922 | 4/2006 |
| EP | 1842836 | 10/2007 |
| EP | 1923366 | 5/2008 |
| JP | 61-060840 A | 3/1986 |
| JP | H04176322 | 6/1992 |
| JP | 09-024240 A | 1/1997 |
| JP | 11-513750 | 11/1999 |
| JP | 2002-355531 | 12/2002 |
| JP | 2003-192407 | 7/2003 |
| JP | 2005349384 | 12/2005 |
| JP | 2010-137163 | 12/2008 |
| RU | 2219987 | 12/2003 |
| RU | 2244016 | 1/2005 |
| RU | 2286200 | 10/2006 |
| WO | 99/050180 | 10/1999 |
| WO | 2012/003423 | 1/2012 |
| WO | 2012024511 | 2/2012 |

OTHER PUBLICATIONS

Gossman, "Precalciner Cement Kiln Mercury (Hg) Emissions Control," GCI Tech Notes, Feb. 2007.

Hurley, "Evaluation of the CyCurex Reagent System for the Removal of Mercury from Coal Combustion Gases, carried out at the Southern Research Institute," Cylenchar Limited, Jun. 16, 2010, pp. 1-35.

Hurley, "CyCurex a revolution in Clean Air Technology," Cylenchar Limited, 2009, pp. 1-4.

"Final Program," The Joint Conference: International Thermal Treatment Technology (IT3) & Hazardous Waste Combustors (HCW) May 18 2009, pp. 1-16.

Nowak, et al., E-mail dated Jun. 16, 2010 to among others the inventors of the application.

Hurley et al., "Agreement between Cylenchar Limited and EES," dated Apr. 9, 2010.

CyCurex® flyer, Mar. 2009.

International Search Report for International Application No. PCT/US2013/031487 dated May 21, 2013, 2 pages.

Supplementary European Search Report for EP Application No. 13 76 1498 dated Oct. 13, 2015, 2 pages.

* cited by examiner

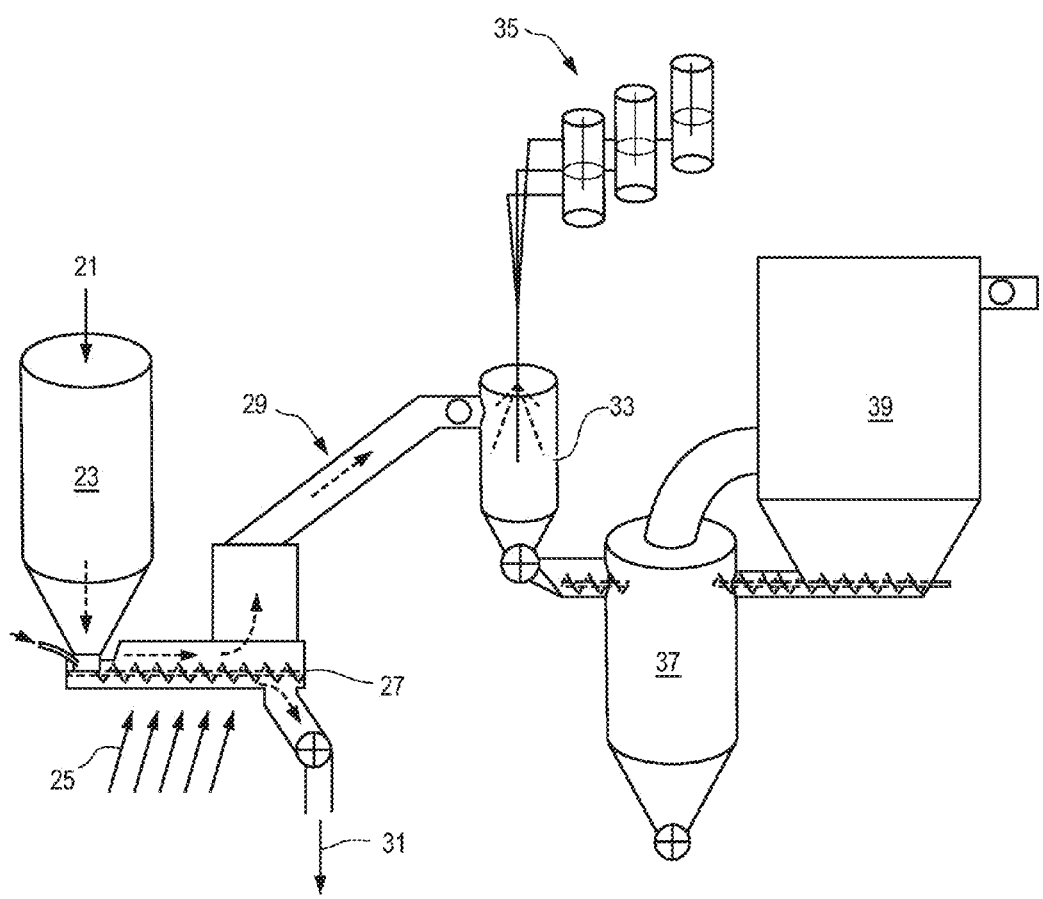

ACTIVATED CARBON AND COAL COMBUSTION RESIDUE TREATMENT SYSTEM AND METHOD

FIELD

The present disclosure relates to treatment of activated carbon and coal combustion residues.

BACKGROUND

In its virgin state, powdered activated carbon (PAC) is a form of activated carbon that has been processed to make the carbon extremely porous, resulting in a large surface area available for adsorption. Other forms of activated carbon are generally coarser, with larger particle sizes. Both forms of activated carbon may be used to capture undesirable contaminants, pollutants, or other unwanted compositions, including heavy metals such as mercury, from the flows, exhaust streams, or other industrial process streams arising from operation of power plants, cement kilns, incinerators, and other industries. PAC is often preferred, worldwide, to capture forms of mercury and other heavy metals from an exhaust gas stream from any of the foregoing industrial plants. As a result of its use in industrial processes, PAC is not only a specialty product, but one which is often not recycled due to the challenges in properly handling the mercury and other heavy metals captured by the PAC.

Accordingly, the used (or "spent") PAC, laden with mercury and other heavy metals, generally presents a disposal dilemma. Spent activated carbon containing less than two hundred sixty (260) ppm mercury may be landfilled or stabilized, for example, trapped in concrete, in accordance with current Federal regulations. On the other hand, spent activated carbon containing greater than two hundred sixty (260) ppm mercury is considered to be in a high mercury subcategory and is banned from landfilling. It is the spent activated carbon containing greater than two hundred sixty (260) ppm mercury which is now accumulating in warehouses and in abandoned mines at an estimated rate of one thousand (1000) tons per year. Further, the problem of disposal of spent activated carbon is not unique to the United States of America.

Spent activated carbon may be recycled or regenerated through a process known as thermal regeneration. This technique, however, has certain drawbacks and disadvantages. For example, the finer physical characteristics of PAC itself make this form of activated carbon generally unsuitable for thermal regeneration processes used for the spent activated carbon in general. Furthermore, the thermal regeneration process requires equipment and processes suitable to cause high temperature desorption to occur, generally requiring both an inert atmosphere and operational temperatures greater than about five hundred (500) degrees Celsius. This causes the contaminants to be desorbed from the activated carbon and enter a gas stream. Still further, in order to neutralize or "burn off" the contaminants, a second process phase is generally required, in which the gas stream must be contained and processed, often at still higher temperatures than the first phase, such as 2300 degrees Fahrenheit.

While such thermal regeneration may neutralize certain contaminants, it generally does not address heavy metals, such as mercury, which may remain in the gas stream after thermal regeneration, requiring the counterproductive, further application of virgin activated carbon or PAC in order to recapture the heavy metals from the stream.

In most typical industrial applications, spent activated carbon or spent PAC may be caught in a particulate collection system such as a baghouse or electrostatic precipitator. In certain industries, the spent PAC may be captured as an independent material stream, while in others; the spent PAC may be mixed with other particulates such as fly ash. Regardless of the approach to catching spent activated carbon or spent PAC, its further processing and uses are severely restricted because of its mercury or other heavy metal content. So, for example, fly ash mixed with spent PAC may not be utilized by cement kilns as a raw material due to the mercury and heavy metal content which volatilizes in the cement kiln process. Further, the spent PAC can be troublesome to utilize in ready mix concrete due to foam index problems caused by the carbon itself. As a result, spent PAC is primarily a waste which must be land filled.

The properties and composition of the spent PAC can be significantly affected by the raw materials, adsorption agents, design or operation of a PAC Injection system. Thus, the constituent chemical and physical characteristics of the spent PAC, the spent PAC with fly ash, or other coal combustion residues (CCRs) must be evaluated on an individual plant or facility basis. For example, the spent PAC, the spent PAC with fly ash, or other CCRs may in effect alter the pH and concentration or dosage of the required reagent solution for each specific facility.

SUMMARY

Treatment systems and methods for spent activated carbon, spent powdered activated carbon (PAC), and/or coal combustion residue (CCR) are disclosed herein. It should be appreciated that activated carbon used in industrial plants may take on many forms or names, including powdered activated carbon, as can coal combustion residue, and that the systems and methods disclosed herein shall not be limited to the disclosed implementations, but may cover other activated carbons and residues. In an illustrative embodiment, the treatment systems and methods disclosed herein relate to the removal of mercury and other heavy metals from spent activated carbon which has previously been used for heavy-metal pollution reduction. In another illustrative embodiment, the treatment systems and methods disclosed herein relate to the removal of mercury and other heavy metals from CCRs or byproducts such as fly ash, bottom ash, and/or synthetic gypsum. Both fly ash and flue-gas desulfurization (FGD) residues have been identified as CCRs with the potential to have increased mercury and/or other pollutant concentrations.

In an illustrative embodiment, a method for treating spent PAC and/or one or more CCRs includes collecting the spent PAC and/or CCR(s) and heating the collected PAC and/or CCR(s) at high temperatures in an oxygen depletion zone (sometimes referred to as an "inert atmosphere") to separate at least one heavy metal from the collected PAC and/or CCR(s) to create a cleaned PAC and/or CCR(s) stream and a heavy metal stream. In the oxygen depletion zone the oxygen content is about two percent (2%) or less in order to eliminate the opportunity for combustion of the spent PAC and/or CCR(s) at the high temperatures.

Additionally, the method may include providing a water soluble alkaline-earth metal polysulfide, combining the heavy metal stream with the water soluble alkaline-earth metal sulfide to create a combined stream, and removing at least a portion of one heavy metal from the combined stream.

In an illustrative embodiment, the method may include providing a catalyst to create the combined stream, and/or providing a hyperdispersant or surfactant to create the combined stream.

Advantages of the treatment systems and methods disclosed herein include the ability to treat the spent PAC and/or CCR(s) before being landfilled or otherwise disposed of, and allowing the treated PAC and/or CCR(s) to be recycled back into other uses to minimize the potential release of heavy metals. Through the combination of a thermal desorption process and use of chemical reagents, spent PAC and/or CCR(s) can be recycled, re-activated, and re-used. Additionally, through a similar process of heat application in an inert environment mercury and other heavy metals can be removed from spent PAC and/or CCR(s) and captured with a chemical reagent as a residue. In either case the resulting residue should be highly concentrated and in a stable non-leachable form. This residue can then be disposed of, recycled or used as a salable raw material in other processes.

These and other aspects of the disclosure may be understood more readily from the following description and the appended drawings.

BRIEF DESCRIPTION OF THE DRAWINGS

An embodiment of the activated carbon and coal combustion residue treatment system and method is illustrated in the figure of the accompanying drawing which is meant to be exemplary and not limiting, in which like references are intended to refer to like or corresponding parts, and in which:

FIG. 1 illustrates a diagram of an embodiment of an apparatus and related methods for treating spent powdered activated carbon (PAC) and/or coal combustion residues (CCRs).

DETAILED DESCRIPTION

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching those skilled in the art to variously employ the present invention.

A treatment system and method for treating and/or reducing pollution from powdered activated carbon (PAC) and/or coal combustion residues (CCRs) according to an illustrative embodiment is described with reference to FIG. 1. As illustrated in FIG. 1, spent PAC and/or one or more CCR(s) 21 may be collected from a particulate collection system, for example, a baghouse or an electrostatic precipitator (ESP), and transferred to a storage unit 23, for example, a silo. From the storage unit the spent PAC and/or CCR(s) are transferred to a volatilization vessel or zone 25. As illustrated in FIG. 1, the spent PAC and/or CCR(s) are transferred to or through the volatilization vessel 25 via a metering screw 27. It should be appreciated by those skilled in the art that the exact configuration of the conveying mechanism, whether by metering screw or other means, and the configuration of the volatilization zone or vessel, as well as their spatial relation to each other, may be varied depending on the particular application, and so means or method of transferring the spent PAC and/or CCR(s) to the volatilization vessel beyond that illustrated may be used.

To volatilize the mercury and/or other heavy metals captured in the spent PAC and/or CCR(s), heat is added to the spent PAC and/or CCR(s), in this version in the volatilization zone 25. For example, mercury's boiling point is about three hundred fifty-six and fifty-eight hundredths (356.58) degrees Celsius or about six hundred seventy-three and eight hundred forty-four thousandths (673.844) degrees Fahrenheit, after which point mercury exists as a gas. Testing has shown that various forms of mercury will volatilize at much lower temperatures beginning as low as one hundred (100) degrees Celsius and be measured in a mercury analyzer.

In an illustrative embodiment, heat may be added to the spent PAC and/or CCR(s) at the metering screw 27, and/or at a volatilization vessel surrounding or following the metering screw. The mercury and other heavy metals captured in the spent PAC and/or CCR(s) will vaporize into a gas stream 29, generally combined with the inerted atmosphere, leaving a cleaned PAC and/or CCR(s) stream 31 that may be removed and/or recycled into the system. The application of heat may be varied to suit the particular industrial process or application. In one possible implementation, the amount of heat energy expended is tailored to be sufficient to separate the mercury from the spent PAC and/or CCR(s), without being so excessive as to waste energy. In some applications, a minimum desirable temperature to be applied is 356 degrees Celsius, which corresponds to the sublimation temperature (solid to vapor) for mercury, but again, it is possible that mercury separation from the spent PAC or CCR for some processes may be accomplished with lower temperatures down to 150 degrees Celsius, or may more advantageously occur at temperatures as high 500 degrees Celsius.

In an illustrative embodiment, waste heat or excess heat from one or more processes within the power plant, kiln, cooler, or other industrial process may be used to elevate the temperature of the spent PAC and/or CCR(s) to the point of causing the heavy metals to release from the spent PAC and/or CCR(s). In the absence of waste or excess heat, or if such heat is insufficient, a booster heat source, or any other suitable heat source, gas, electric, or otherwise, may be operatively associated with spent PAC and/or CCR(s). The potential for combustion of the PAC and/or CCR(s) exists at high temperatures. Therefore, when heating the spent PAC and/or CCR(s), in one preferred embodiment, the volatilization zone 25 should be an inert atmosphere, for example, an oxygen depletion zone containing an oxygen content of about two percent (2%) or less, or a suitable inerting gas.

In another illustrative embodiment, the spent PAC and/or CCR(s) may be heated to the point of combustion. This will release any heavy metals including mercury contained therein into the gas stream which can be treated with the reagent chemicals. This also results in creating a residual combustion ash, which may be collected and utilized or disposed of.

The air stream or gas stream containing vaporized mercury and other heavy metals can then be transferred to a treatment unit. In an illustrative embodiment, a treatment unit 33 includes, but is not limited to, ductwork, chambers, and the like. A treating solution 35 is injected or sprayed into the air stream containing the vaporized mercury and/or other heavy metals, to thereby treat and at least partially remove mercury and/or other heavy metals from the air stream. The spray pattern, droplet size, spray rate, and other parameters of the treatment unit 33 are selected to achieve the mercury reduction levels sought for the particular industrial process.

In an illustrative embodiment, the treating solution is an aqueous spray solution containing a water soluble alkaline-earth sulfide and/or polysulfide. In one embodiment, the alkaline-earth metal polysulfide may be either a magnesium polysulfide or a calcium polysulfide, and the alkaline-earth metal polysulfide may be present in the solution in an amount of about one percent (1%) to about twenty-nine percent (29%) in water. In another embodiment, the alkaline-earth metal polysulfide is a mixture of one or more magnesium polysulfides and one or more calcium polysulfides, wherein the polysulfides are present in the solution in an amount of about one percent (1%) to about twenty-nine percent (29%) in water.

It should be appreciated by those skilled in the art that the amount of the alkaline-earth sulfide and/or polysulfide in the treating solution can vary outside of the ranges listed above. In many applications, the economic goal may be to use as little of the alkaline-earth sulfide and/or polysulfide as operationally possible. For example, the amount of the alkaline-earth sulfide and/or polysulfide used can vary dependent upon the dispersion in the air stream, the velocity of the air stream, the concentration of mercury and other heavy metals in the air stream, and other parameters of the type.

In an illustrative embodiment, the treating solution may include one or more catalyst agents having a pH of about seven (7) or more, such as a suitable phosphate. However, it should be appreciated by those skilled in the art that depending on the pH of the PAC and/or CCR(s) and/or the air stream containing the vaporized mercury and/or other heavy metals, the catalyst agent may not be used.

In another illustrative embodiment, the treating solution may include one or more surfactants, dispersants, and/or hyperdispersants. In one embodiment, the surfactant, dispersant, and/or hyperdispersant is composed of one or more polyethylene oxide-polyethylene block co-polymers and/or the phosphate esters thereof. The addition of the surfactant, dispersant, and/or hyper dispersant to the treating fluid may be optional. When the surfactant, dispersant, and/or hyper dispersant is included, the surfactant, dispersant, and/or hyper dispersant may be provided in an amount sufficient to assist in maintaining the reaction agent or reagent in the treating fluid prior to reaction with the metal(s).

Additionally, the treating solution may include the alkaline-earth sulfide and/or polysulfide, one or more surfactants, dispersants, and/or hyper dispersants, and one or more catalyst agents.

In an illustrative embodiment, upon treating the air stream with the treating solution the vaporized mercury and/or other heavy metals precipitate out of the air stream and the precipitate may be filtered out. The precipitate is the residue from the above-described treatment process and system, in the form of mercury and/or other heavy metals and contaminants. This residue may be collected or otherwise filtered out by any suitable means, in this implementation shown as a residue silo 37. In connection with handling the mercury or other contaminant residue, the collected mercury and/or other heavy metals can then be further processed, recycled or otherwise disposed of properly. A small particulate filter 39, shown downstream of the silo 37, can be used as part of the residue treatment process, and, in certain implementations, may be placed or otherwise configured to capture the heavy metal portion of the resulting gas stream. Similarly, other implements and processing equipment may be employed in connection with the residue formed by the treatment process, such that the mercury or other heavy metals are captured in dry form or in liquid form, such as a slurry, depending on the industrial process, goals or any number of parameters. The mercury or other heavy metal residue collected through this process may assume still further characteristics or form, depending on the application.

The remaining clean air is then exhausted to the atmosphere through a particulate collection system. Any residue which is further captured in the particulate collection system may be returned to the storage bin.

In an illustrative embodiment, the treatment system and method illustrated in FIG. 1 may be used to treat the spent PAC and/or CCR(s) on a continuous basis or a non-continuous basis to remove mercury and/or other heavy metals from the PAC and/or CCR(s) as the concentrations increase in the PAC and/or CCR(s). The non-continuous basis may be tailored to or in response to measurements of the amount of mercury and/or other heavy metals taken from one or more samples of the PAC and/or CCR(s).

In an illustrative embodiment, the volatilization vessel may take a variety of forms, including, but not limited to, ductwork, chambers, and other vessels of the type. The particulate collection system may be any of the variety of apparatus suitable for capturing, filtering, or otherwise collecting dust from industrial plants or power plants and other various operations. Given the variety of industrial plant or power plant configurations possible, it should be appreciated by those skilled in the art that the particulate collection system, as well as the apparatus or system for treating the spent PAC and/or CCR(s) may be operatively associated with one or more operations of the industrial plant or power plant capable of receiving material for treatment, at any number of suitable locations relative to the components of the industrial plant or power plant. In many possible implementations, the treatment apparatus will be operatively associated with the industrial process to receive the spent PAC and/or CCR(s) after their point of collection in the facility, and to return the cleaned PAC and/or CCR(s) before their point of introduction into the industrial process.

Although the treatment systems and methods have been described and illustrated in connection with certain embodiments, many variations and modifications will be evident to those skilled in the art and may be made without departing from the spirit and scope of the invention.

For example, while PAC and/or CCR(s) have been discussed as the material being treated, the above-described systems and methods, and variations within the spirit and scope of this disclosure, are also suitable for forms of activated carbon other than PAC, of any coarseness, particle size, or characteristics, alone or in combination with other compositions or gas-stream constituents, whether used to capture mercury, heavy metals or other contaminants, associated with any number of industrial processes. Similarly, residues other than CCR(s) may likewise be treated using the implementations described herein, and suitable variations within the spirit and scope of this disclosure.

The disclosure is thus not to be limited to the precise details of methodology or construction set forth above as such variations and modifications are intended to be included within the scope of the disclosure.

What is claimed is:

1. A method for treating spent powdered activated carbon (PAC) and/or coal combustion residues (CCRs), comprising:
    creating a clean stream and a stream of volatilized heavy metal by heating at least one of a spent PAC and/or a CCR, wherein the heating causes at least one heavy metal to separate from the at least one of the spent PAC and the CCR, resulting in the stream of volatilized heavy metal and the clean stream;
    forming a combined stream by combining a water soluble alkaline-earth metal sulfide with the stream of volatilized heavy metal created from heating the at least one of the spent PAC and/or CCR to form a heavy metal precipitate; and removing from the combined stream at least a portion of the at least one heavy metal consisting of the heavy metal precipitate formed from combining the water soluble alkaline-earth metal sulfide with the stream of volatilized heavy metal.

2. The method of claim 1, further comprising collecting at least one of the spent PAC and/or the CCR from an industrial process.

3. The method of claim 1, further comprising providing the water soluble alkaline-earth metal sulfide.

4. The method of claim 1, wherein the combining step includes combining a catalyst with the stream of volatilized heavy metal.

5. The method of claim 1, wherein the combining step includes combining a surfactant or hyperdispersant with the stream of volatilized heavy metal.

6. The method of claim 1, wherein the heating step includes heating at least one of the spent PAC and/or the CCR in an inert atmosphere.

7. The method of claim 1, further comprising allowing the at least one of the spent PAC and/or the CCR to combust creating a residual combustion ash.

8. The method of claim 7, further comprising collecting the residual combustion ash.

9. The method of claim 1, wherein combining step includes spraying the water soluble alkaline-earth metal sulfide into the stream of volatilized heavy metal.

10. The method of claim 1, further comprising capturing the removed portion of the at least one heavy metal from the combined stream in a particulate filter.

11. The method of claim 1, wherein the water soluble alkaline-earth metal sulfide comprises one of a calcium polysulfide or a magnesium polysulfide.

* * * * *